United States Patent [19]

Sato et al.

[11] Patent Number: 4,940,479
[45] Date of Patent: Jul. 10, 1990

[54] METHOD FOR MANUFACTURING FLOAT GLASS

[75] Inventors: Yasuo Sato; Tsunehiro Saito, both of Yokohama; Toshihito Kamioka, Matsudo; Yukio Yoskikawa, Kawasaki; Masaaki Yoshikawa, Yokohama, all of Japan

[73] Assignee: Asahi Glass Company, Ltd., Tokyo, Japan

[21] Appl. No.: 234,677

[22] Filed: Aug. 22, 1988

[30] Foreign Application Priority Data

Aug. 24, 1987 [JP] Japan .................. 62-208354

[51] Int. Cl.⁵ .................. C03B 18/04; C03B 18/10
[52] U.S. Cl. .................. 65/99.2; 65/99.5; 65/99.6; 65/182.3; 65/182.4
[58] Field of Search .................. 65/99.5, 99.6, 182.3, 65/99.2, 182.4

[56] References Cited

U.S. PATENT DOCUMENTS

| | | | |
|---|---|---|---|
| 3,733,190 | 5/1973 | Lawrenson et al. | 65/99.6 |
| 3,853,523 | 12/1974 | Dickinson et al. | 65/99.5 |
| 3,860,406 | 1/1975 | Basler et al. | 65/99.5 |
| 4,012,216 | 3/1977 | Marchand | 65/99.6 X |
| 4,784,680 | 11/1988 | Sato et al. | 65/99.6 |

FOREIGN PATENT DOCUMENTS 1245328  9/1971  United Kingdom .............. 65/182.3

Primary Examiner—Arthur Kellogg
Attorney, Agent, or Firm—Oblon, Spivak, McClelland, Maier & Neustadt

[57] ABSTRACT

A direct current magnetic field is applied to a molten metal bath to control the movement of molten metal. A glass ribbon is formed on the molten metal bath to have a predetermined thickness and is moved on the surface of the molten metal bath controlled by the magnetic field, during which the glass ribbon is cooled.

7 Claims, 4 Drawing Sheets

METHOD FOR MANUFACTURING FLOAT GLASS

BACKGROUND OF THE INVENTION

1. Field of the Invention

The present invention relates to a method for manufacturing float glass.

2. Discussion of the Background

A molten metal bath used for the method of manufacturing float glass is divided generally into three regions along a direction of movement of a glass ribbon. A first region is called a fire polishing region which is adapted to receive molten glass on the surface of molten metal bath in which a glass ribbon having an equilibrium thickness is formed while the width of the glass ribbon is expanded and at the same time the surface of the ribbon is made flat. Generally, soda-lime glass is used for the molten glass and it is kept at a temperature of 1,110° C.–950° C. A second region is used for forming the glass ribbon in a predetermined thickness. The second region is so constructed especially that when glass having a thickness lower than an equilibrium thickness is to be formed, a pulling force is applied to the glass ribbon in its longitudinal direction while top rollers are engaged with both edges of the glass ribbon to suppress contraction of the glass ribbon in its width direction to thereby form the glass ribbon having a predetermined thickness. In the second region, the top rollers are placed to be engageable with the glass ribbon. Further, the second region is kept at a temperature sufficient to change the thickness of the glass ribbon when it is pulled by a pulling force. Namely, the glass ribbon is formed at a temperature range of about 950° C.–800° C. when soda-lime glass is used. A third region is so adapted that the glass ribbon formed in a predetermined thickness can be drawn from the molten metal bath and the glass ribbon is cooled to a temperature suitable to be transferred by means of rollers. The third region is kept at a temperature ranging from about 800° C.–600° C. when soda-lime glass is used.

A temperature distribution formed in the molten metal bath in its longitudinal direction has been attained by changing the depth of the metal bath as shown in Japanese Examined Patent Publication No. 18353/1966, or by arranging a barrier at the boundary of each region. However, in the method of obtaining a predetermined temperature distribution by changing the depth of the metal bath, it is necessary to use a molten metal bath having a depth of 40 mm in order to avoid reduction in processability. Accordingly, when a temperature distribution is formed in the metal bath in its longitudinal direction, there takes place a strong convection current in the molten metal bath, so that a gradient of temperature in the bath becomes flat. Therefore, it is necessary to obtain a predetermined temperature distribution by increasing the length of the molten metal bath. However, it increases an amount of released heat and a large-sized apparatus is required to manufacture a glass ribbon.

In the method of using a barrier in the molten metal bath, a large temperature difference is produced between the upstream side and the downstream side of the barrier and there takes place a strong convection in a spiral form along the barrier. The convection current changes a temperature distribution in the molten metal bath, whereby small stripe-like ridges and recesses, i.e. a so-called distortion results in the glass ribbon.

Further, in the later method, it is necessary to determine the upper end of the barrier to be 20 mm–30 mm lower than that the bath surface of the molten metal in order to avoid the contact between the barrier and the glass ribbon. Therefore, an effect of interruption of heat from the molten metal can not be obtained. In the conventional method, the depth of the metal bath is so determined that the longest thin glass ribbon can be produced. Accordingly, when a glass ribbon having a relatively large thickness is manufactured, there is a useless glass ribbon forming region, which is results in increases heat loss.

On the other hand, use of a movable barrier system is proposed. However, a movable barrier can not be used for a vessel in which the cross-sectional area in its width direction is not uniform.

Summary of the Invention

It is an object of the present invention to provide a method for manufacturing float glass which is capable of controlling the movement of a molten metal bath, whereby a distortion produced in a glass ribbon can be reduced and which reduces the length of a vessel for holding the molten metal bath to thereby greatly reduce heat loss.

Foregoing and the other objects of the present invention have been attained by providing a method for manufacturing float glass by continuously supplying molten glass on the surface of a molten metal bath to form a glass ribbon, characterized by applying a direct current magnetic field to the molten metal bath to control the movement of the same, moving the glass ribbon forwardly along the bath surface so as to provide a predetermined thickness, and cooling the glass ribbon having the predetermined thickness by advancing it on the surface of the molten metal bath controlled by the direct current magnetic field.

A direct current magnetic field (hereinbelow, referred to as a d.c. magnetic field) used in the present invention is a magnetic field excited by a direct current without pulsation or a full-wave-rectified d.c. current, or produced by using a permanent magnet.

The method of the present invention utilizes an Lorentze force which is used for controlling the movement of the molten metal bath by applying the d.c. magnetic field to the molten metal bath when it moves in the direction transversing a magnetic flux. Namely, the movement of the molten metal bath caused by a gradient of temperature, the movement of glass ribbon and other causes is suppressed by the d.c. magnetic field.

The magnitude of the d.c. magnetic field required for controlling the movement of the molten metal bath becomes large as the depth of the molten metal bath is greater, and the gradient of temperature in the metal bath is larger. For instance, when the depth of the bath is 40 mm, and the gradient of temperature in the bath is 100° C./m, some effect is obtained at about 0.03 Tesla, and the movement of the molten metal bath can be substantially suppressed at 0.4 Tesla–0.6 Tesla.

As the means of applying the d.c. magnetic field, a parmanet magnet, a d.c. electromagnet and so on may be used. In the present invention, the d.c. electromagnet is most desirable because the strength of the magnetic field can be easily adjusted. Generally, such means is arranged at the upper part or the lower part of the molten metal bath. With respect to this, it is preferable to arrange the d.c. magnetic field producing means at the lower part of the molten metal bath because a sufficient space can be provided at the upper part of the glass so that work required for installing a heater and a cooler for adjusting the temperature of the glass ribbon is easy.

The d.c. magnetic field producing means may be provided at both the upper and lower parts of the molten metal bath. At least one superconductive coil may be used to provide a further large d.c. magnetic field, instead of the electromagnet.

Brick Description of the Drawings

DESCRIPTION OF THE PREFERRED EMBODIMENTS

In the following, preferred embodiments of the present invention will be described with reference to the drawings.

Figure 1:
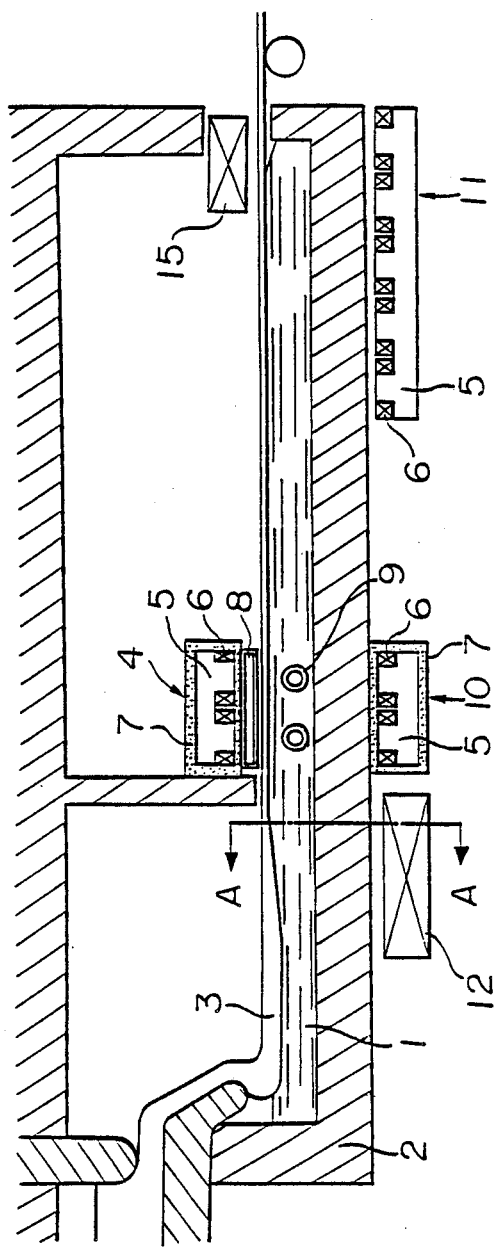
FIG. 1 is a longitudinal cross-sectional view of an embodiment of an apparatus for carrying out the method for manufacturing float glass according to the present invention.
Figure 2:
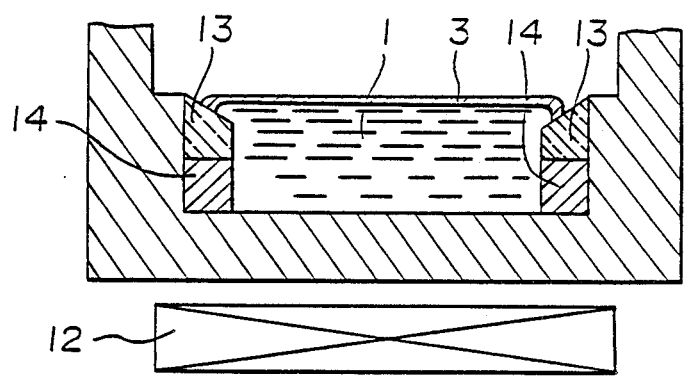
FIG. 2 is a cross-sectional view taken along a line A—A in FIG. 1.

In FIGS. 1 and 2, a reference numeral 1 designates a molten metal bath, a numeral 3 designates a glass ribbon, and numerals 4, 10, 11 designate d.c. magnets. The d.c. magnet 4 is disposed in an upper space in a vessel 2 holding the molten metal bath 1 at a position near the glass ribbon so as to suppress the movement of the molten metal bath. The position of the d.c. electromagnet 4 adjoins an area where the glass ribbon is formed substantially in a predetermined thickness. The d.c. electromagnet 4 comprises an iron core 5, a plurality of windings 6 wound around the iron core and a heat insulating material such as a castable covering the outer circumferenece of the iron core and windings. The windings 6 are cooled by feeding water into a pipe made of copper to prevent the windings from overheating (although the pipe is not shown in the Figures)

Numerals 8 and 9 designate cooling devices for cooling the glass ribbon.

The d.c. electromagnet 10 is separately provided below the vessel 2 so as to oppose the d.c. electromagnet 4 in the vessel 1. The d.c. electromagnet 10 also comprises an iron core 5, a plurality of windings 6 to be cooled by water and a heat insulating material 7 covering the outer circumference of the iron core and the windings in the same manner as the electromagnet 4.

The d.c. electromagnet 11 is disposed near the outlet of the vessel 1 to suppress the movement of the molten metal at or near the outlet. The d.c. electromagnet 11 also has the same construction as the elctromagnets 4, 10.

A linear induction motor 12 is disposed below the vessel 1 so that a travelling magnetic field (which travels toward the downstream side of the vessel) is applied to the molten metal bath, whereby an electric current is induced in the molten metal bath. The resulting electric current receives an Lorentze force by the travelling mganetic field. As a result, a body force is produced in the molten metal bath in the same direction as the travelling magnetic field, whereby the level of a first horizontal bath surface formed at the upstream side in the vessel is lower than a second horizontal bath surface at the downstream side as shown in FIG. 1.

In the vessel shown in FIG. 1, purified molten glass is continuously supplied on the first horizontal surface of the molten metal bath. The supplied molten glass spreads on the bath surface to form a glass ribbon 3 having a substantially equilibrium thickness and the surface of the glass ribbon 3 is fire-polished. The viscosity $\eta$ (in poise) of the glass in the above-mentioned region is in a range of 3.1–4.8 in common logarithm The glass ribbon 3 is moved forwardly from the first bath surface to the second bath surface while it is stretched by a pulling force of a lehr to have a predetermined thickness.

It is desirable that a difference in height formed between the first and second bath surfaces is large as the predetermined thickness of glass ribbon i.e. the thickness of a glass product is thin. Specifically, when a glass plate having a thickness of 1.1 mm is manufactured, it is desirable to determine the height difference to be in a range of 3 mm–4 mm. When a glass plate having a thickness of 3 mm is prepared, it is desirable to determine the height difference to be in a range of about 2 mm. The greater the travelling magnetic field is, the greater the height difference is. Specifically, the height difference of about 2.8 mm is produced by applying a travelling magnetic field of $5 \times 10^{-3}$ Tesla in the region having a length of 1 m in the directiosn of moving the glass ribbon. It is preferable to determine the viscosity of the glass ribbon in a range of 3.1–4.4 (log $\eta$). When the viscosity is greater than the above-mentioned range, it is difficult to make the thickness of the glass ribbon thin. On the other hand, when the viscosity is smaller than the range, it takes a long time to cool the glass ribbon, this requiring a long vessel.

The width of the glass ribbon tends to contract due to surface tension and a pulling force of the lehr in the range of viscosity as above-mentioned. Glass ribbon width maintaining members 13 are provided in the inner side surfaces of the vessel 1 in order to prevent the glass ribbon 3 from contracting in its width direction as shown in FIG. 2. The maintaining members 13 are made of a material difficult to wet a molten metal and glass, such material being made of, for instance, graphite or BN. Each of the maintaining members 13 is so formed that the upper surface is inclined inwardly and downwardly so that the bath surface of the molten metal in the vessel 1 forms a meniscus and both edges of the bath surface are in contact with the inclined surfaces as shown in FIG. 2. The glass ribbon takes a configuration in which both edges are along the shape of the glass surface of the molten metal bath, whereby contraction in the width of the glass ribbon is prevented. It is preferable that the maintaining members 13 extend to positions where the thickness of the glass ribbon is not substantially changed, i.e. the viscosity of the glass ribbon is about 6.5 (log $\eta$).

Then, the glass ribbon is moved forwardly on the bath surface of the molten metal bath to which a d.c. magnetic field is applied by the d.c. electromagnets 4, 10 to substantially suppress the movement of the molten metal, and the ribbon is rapidly cooled to have a viscosity (long $\eta$) of about 6.5 by the cooling devices 8, 9. Since there is no substantial movement in the molten metal bath in this region, the functions of conduction and radiation substantially contribute to the transfer of heat in the vessel. Accordingly, no local change in temperature is caused even when the glass ribbon is rapidly cooled, and distortion does not take place in the glass ribbon. Further, a large gradient of temperature can be provided in the vessel in the direction of moving the glass ribbon. In this case, the strength of the d.c. magnetic field formed by the d.c. electromagnets is in a range of about 0.1 Tesla-about 0.6 Tesla. When such a large magnetic field can be provided, either of the electromagnets 4, 10 can be eliminated. Further, either or both of the cooling devices 8, 9 may be eliminated when a rapid cooling rate can be obtained for the glass ribbon. A reference numeral 14 designate an electric conducting material made of tungsten, which prevents a body force by the linear induction motor 12 from reducing in the vicinity of the side walls of the vessel.

The glass ribbon 3 is moved forwardly while being cooled, and it reaches an area on the bath surface where a d.c. electromagnet 11 is disposed. The molten metal bath in this area is subjected to control of its movement by the electromagnet 11. In this case, the strength of the magnetic field formed by the d.c. electromagnet 11 is a range of about 0.03 Tesla-0.1 Telsa. The glass ribbon is moved forwardly on the bath surface until the glass ribbon has a viscosity (log $\eta$) of 6.5-14.5 during which the glass ribbon is gradually cooled.

A reference numeral 15 designates a linear induction motor which provides a body force to urge the molten metal bath to the upstream side, whereby it prevents the molten metal from overflowing at the outlet of the vessel which is lower than the bath surface. Accordingly, the cooled glass ribbon is pulled horizontally from the bath surface without contacting the vessel.

Figure 3:
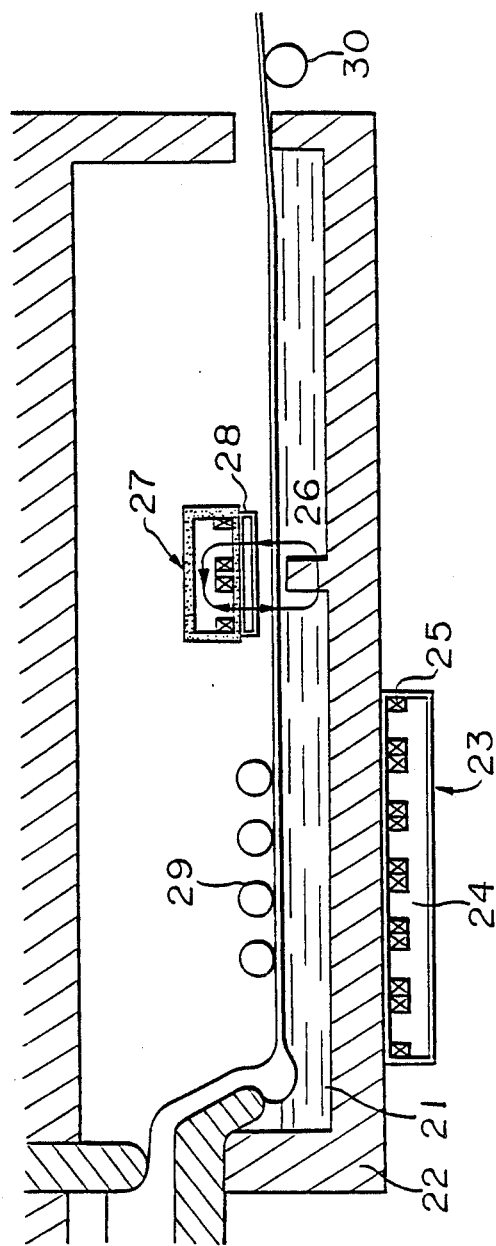
FIG. 3 is a longitudinal cross-sectional view of another embodiment of apparatus for carrying out the method of the present invention.
Figure 4:
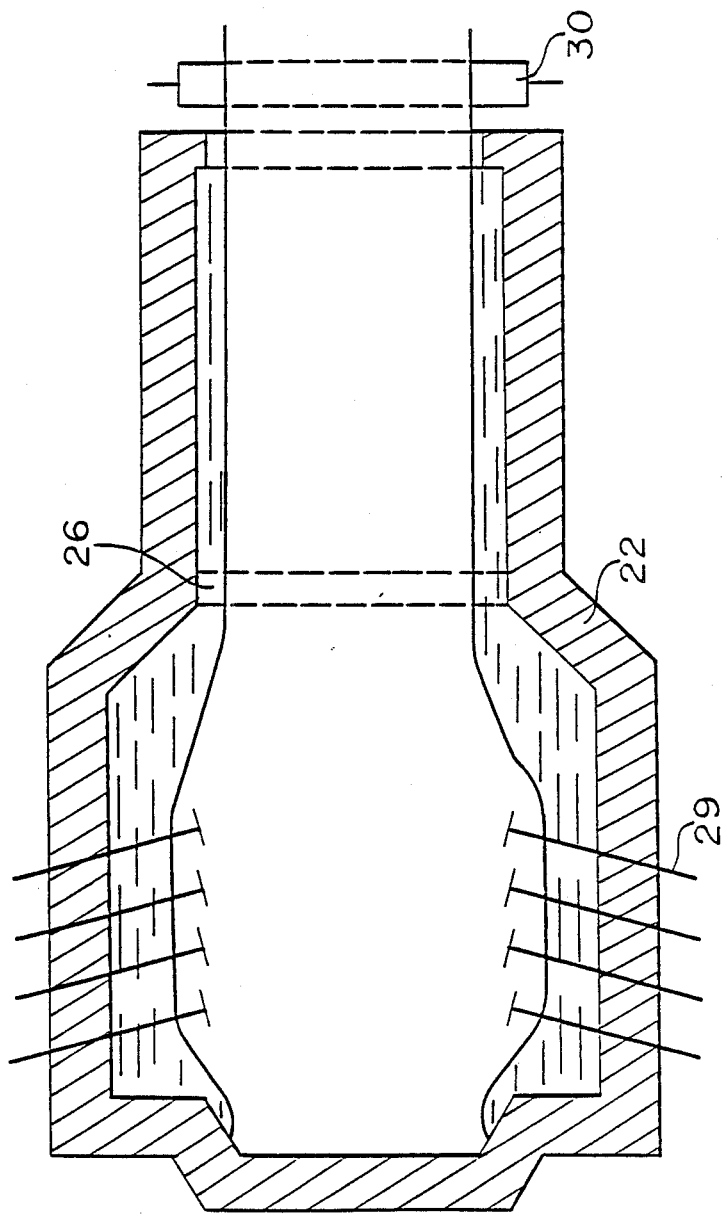
FIG. 4 is a plane view partly cross-sectioned of the apparatus shown in FIG. 3.

FIGS. 3 and 4 shows another embodiment of the apparatus used for carrying out the method of manufacturing float glass of the present invention.

In FIGS. 3 and 4, a reference numeral 21 designates a molten metal bath and numerals 23, 27 designate d.c. electromagnets.

A d.c. electromagnet 23 is disposed below a vessel 22 which holds the molten metal bath 21. The electromagnet 23 comprises an iron core and a plurality of windings 25 so that a d.c. magnetic field of about 0.03 Tesla-0.1 Tesla can be applied to the molten metal bath. A barrier 26 is arranged in the vessel 22 at the downstream side of the electromagnet 23. The upper edge of the barrier 26 is determined to be lower than the bath surface of the molten metal bath by about 25 mm.

A second d.c. electromagnet 27 is disposed above the barrier 26 in the vessel 22, and a cooling device 28 is provided at the lower surface of the second d.c. electromagnet 27. The electromagnet 27 comprises an iron core and a plurality of windings in the same manner as the electromagnet 23 so that a magnetic field of about 0.1 Tesla-0.6 Tesla can be applied to the molten metal bath.

In the device having the above-mentioned construction, a purified molten glass is continuously supplied onto the molten metal bath to form a glass ribbon. Then, the glass ribbon is engaged with a plurality of top rollers 29 which are provided near both inner sides of the vessel 22 and cooled by water so that the glass ribbon is moved forwardly while it receives forces in both directions of the upstream and width, whereby it is formed to have predetermined thickness. There are convections having the a same swirling direction at both sides of the barrier 26. Namely, there is a convection at the upstream side of the barrier, which flows from the upper part to the lower part along the barrier 26 by a cooling effect of the bath at the downstream side. On the other hand, there is a convection at the downstream of the barrier, which flows from the lower part to the upper part along the barrier by heating effect at the upstream side. At the upper part of the barrier 26, the molten metal bath flows from the upstream side to the downstream side at its surface area, and it flows from the downstream side to the upstream side in the vicinity of the top end of the barrier. On the other hand, there is produced a magnetic flux, as indicated by arrow marks, by the d.c. electromagnet 27. When a flow of the molten metal bath along the barrier 26 intersects the magnetic flux, it receives a suppressing force. The strength of the magnetic field of about 0.03 Tesla is effective enough.

In the apparatus described above, the d.c. electromagnet to form a d.c. magnetic field may be replaced by a permanent magnet.

The present invention is applicable to the manufacture of float glass having an equilibrium thickness or a greater thickness although description has been made as to the manufacture of float glass having less than an equibilium thickness. In this case, in the apparatus shown in FIG. 1, a desired function can be obtained by changing polarity applied to the linear induction motor 12 to form a travelling magnetic field moving the upper-steam side so that the bath surface of the first horizontal molten metal bath is higher than that of the second horizontal molten metal bath.

When a static magnetic field B is formed in the molten metal and the molten metal is caused to flow at a velocity of u, there is a relation of $E = u \times B$ between the above-mentioned factors and an induced electric field E. When the electric conductivity of the molten metal is $\sigma$, the density of an electric current J is represented by $J = \sigma E$ in accordance with the Ohm's law. The density of the electric current J produces an electromagnetic force of $F = J \times B$ by the action of a magnetic field. The direction of the electromagnetic force F is opposite the direction of the flow of the molten metal, whereby the movement of the molten metal is suppressed.

On the other hand, there is a convection of the molten metal from a high temperature side to a low temperature side in a float bath for forming glass plates. Further, since the molten metal has a small viscosity, there is formed a turbulent flow. In the metal bath, the upper part has a relatively high temperature and the bottom part has a relatively low temperature. However, the flow of the molten metal itself is turbulent. Accordingly, when it is viewed minutely, the molten metal flows in a complicated mixed fashion. On the other hand, there is a stream of circulation when it is viewed generally. Namely, it is considered that a temperature change is caused by mingling of complicated streams in the molten metal and it constitutes a major cause of distortion. When a magnetic field acts on a stream of the molten metal, the viscosity of the molten metal can be increased by the function of electromagnetic induction. A kinematic viscosity $\nu_e$ equivalent to a magnetic field is represented by:

$$\nu_e \propto \frac{\sigma B^2 H^2}{\rho}$$

wheres $\sigma$ is electric conductivity of molten metal, H is a depth of a bath of thin, B is the density of a magnetic flux and $\rho$ is the density of molten metal.

By the effect of the kinematic viscosity, a change of temperature in a minute view and the convection itself in a general view can be suppressed.

In principle, a magnetic field can suppress a stream of molten metal flowing in a direction perpendicular to the direction of a magnetic field. In a long shallow float bath a convection is dominantly produced in the vertical direction to the direction of gravity, i.e. in the horizontal direction of the bath. Accordingly, an effective direction of magnetic field is a vertical component. However, the function to suppress the convection in the bath is not only a magnetic field in the vertical direction, but also the horizontal component in the magnetic field.

When a plurality of windings 27 are arranged as shown in FIG. 3, a region having a magnetic field having a strong vertical component is obtained in correspondence to a coil pitch so that a convection in the horizontal direction can be suppressed. Accordingly, the convection is divided by the coil pitch, and small convections in a swirling form are produced at a region having a weak vertical magnetic field component. However, when continuity of a magnetic flux is considered, there is a magnetic field having a strong horizontal component at a magnetic field having a weak vertical component, whereby a convection in the direction of gravity can be suppressed at this region. Accordingly, the convection in the swirling form is not produced even at the region of the weak vertical magnetic field component. Namely, any convection can be suppressed in any direction when a magnetic field is formed as a whole irrespective of the direction of a magnetic field.

EXAMPLE

A molten tin bath having a depth of 25 mm was prepared. A temperature difference of 100° C. per 1 m was formed in the molten thin bath between the high temperature side and the low temperature side. A magnetic field was formed in the bath by a d.c. electromagnet having a coil pitch of about 75 mm. When a magnetic field of about 0.03 Tesla was applied to the bath, the temperature variation of about 6° C. at the maximum was reduced to 0.2° C. or lower. In this case, heat-interruption effect for the molten thin bath was about 40%.

A magnetic field of about 0.1 Tesla was formed in the same bath. A temperature change could not substantially measured. Heat-interruption effect for the molten thin was about 90% or higher. In this state, substantially the entire heat conducting state is obtainable.

The heat-interruption effect was measured by an amount of reducing power for heating the molten tin by an electric heater at the high temperature side.

In accordance with the present invention, the movement of the molten metal bath can be suppressed, whereby distortion generated in a glass ribbon due to partial change in temperature can be greatly reduced. Further, since heat conduction which results from movement of the bath can be reduced, a large gradient of temperature can be formed in the direction of forwarding the glass ribbon. This minimizes the size of vessel, and accordingly, the apparatus can be small-sized as a whole, and heat loss in the bath can be minimized.

In the present invention, a glass ribbon having a predetermined thickness (thinner than an equilibrium thickness) can be formed by providing a level difference between a first horizontal both surface at the upstream side in the vessel and a second horinzontal bath surface at the downstream side by using a linear induction motor. In this method, it is unnecessary to use top rollers, and accordingly, both edge portions of the glass ribbon can be used as glass products, whereby working efficiency can be increased.

Obviously, numerous modifications and variations of the present invention are possible in light of the above teachings. It is therefore to be understood that within the scope of the appended claims, the invention may be practiced otherwise than as specifically described herein.

We claim:

1. A method for manufacturing float glass by continuously supplying molten glass on the surface of a molten metal bath to form a glass ribbon, which comprises:
   moving a glass ribbon forward over a moving molten metal bath;
   applying a direct current magnetic field to said molten metal bath in a direction to suppress movement of the molten metal bath;
   moving said glass ribbon forwardly along the bath surface so as to give said glass ribbon a predetermined thickness; and
   cooling said glass ribbon having the predetermined thickness while advancing said glass ribbon on the surface of said molten metal bath controlled by said direct current magnetic field.

2. The method for manufacturing float glass according to claim 1, wherein the strength of said direct current magnetic field is in a range of from 0.03 Tesla to 0.6 Tesla.

3. The method for manufacturing float glass according to claim 1, which comprises producing said direct current magnetic field by a direct current electromagnet.

4. The method of manufacturing float glass according to claim 1, which comprises forming a difference in height between a first horizontal bath surface formed at the upstream side of said molten metal bath and a second horizontal bath surface formed at the downstream side, such that a glass ribbon having substantially a predetermined thickness is formed between said first and second bath surface.

5. The method for manufacturing float glass according to claim 4, which comprises forming said height difference by use of a linear induction motor.

6. The method for manufacturing float glass according to claim which comprises moving said glass ribbon forwardly from said first bath surface to said second bath surface when the viscosity in terms of common logarithm of poise of said glass ribbon is in a range of 3.1–4.8.

7. The method for manufacturing float glass according to claim 4, which comprises applying said direct current magnetic field to the downstream side of said molten metal bath.

* * * * *